(12) United States Patent
Daoud et al.

(10) Patent No.: US 6,915,059 B2
(45) Date of Patent: Jul. 5, 2005

(54) STACKABLE OPTICAL FIBER SPLICE TRAY AND MOUNTING SHELVES

(75) Inventors: Bassel H. Daoud, Parsippany, NJ (US); Ivan Pawlenko, Holland, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/448,511

(22) Filed: May 30, 2003

(65) Prior Publication Data

US 2004/0240825 A1 Dec. 2, 2004

(51) Int. Cl.$^7$ ................................................ G02B 6/00
(52) U.S. Cl. ............................................................ 385/135
(58) Field of Search .................................. 385/134–135

(56) References Cited

U.S. PATENT DOCUMENTS

| | | | | |
|---|---|---|---|---|
| 5,546,495 A | * | 8/1996 | Bruckner et al. | ............ 385/135 |
| 6,483,977 B2 | * | 11/2002 | Battey et al. | ................ 385/134 |
| 6,504,986 B1 | * | 1/2003 | Wambeke et al. | ........... 385/134 |

* cited by examiner

*Primary Examiner*—Javaid H. Nasri

(57) ABSTRACT

An optical fiber routing apparatus includes at least one optical fiber splice tray for retaining optical fibers therein, and at least one rack. Each rack includes at least one shelf extending from a rear wall for respectively supporting the at least one optical fiber splice tray. At least one retaining flange is respectively coupled to a front edge of each shelf, and a retaining means is respectively coupled to the rear wall proximate a rear edge of each shelf for retaining an optical fiber tray between the rear wall of the rack and the at least one retaining flange on the front edge of a shelf.

21 Claims, 5 Drawing Sheets

STACKABLE OPTICAL FIBER SPLICE TRAY AND MOUNTING SHELVES

CROSS REFERENCE TO RELATED APPLICATION

This patent application contains subject matter related to commonly assigned U.S. Pat. No. 6,801,704, issued Oct. 15, 2004, and the contents of which are incorporated by reference herein in their entireties.

BACKGROUND OF THE INVENTION

1. Field of the Invention

The present invention generally relates to optical fiber closures, and more particularly, to rack mountable optical fiber trays for improved optical fiber connection and routing features.

2. Description of the Related Art

Optical communications refer to the medium and the technology associated with the transmission of information as light pulses. Many applications utilize an optical fiber network to establish optical communications between network locations. In order to enable optical communication and the flow of optical signals between network locations, various interconnections must be established between different optical fibers.

In all optical interconnection designs, optical splices and optical fan-out pieces are separated from each other in order to minimize congestion and facilitate replacement of damaged components. However, poor organization designs have resulted in excessive bending and crimping of the optical fibers, which may exceed a minimum bend radius of the optical fibers.

Specifically, a key transmission parameter is signal loss per distance transmitted. Due to the sensitive nature of the core of an optical fiber, there is a need to protect an optical fiber from external sources of stress, such as bending, pressure, and strain, which increase signal loss. For example, an optical fiber should not be bent sharply anywhere along its path. If an optical fiber is bent past a critical angle, portions of transmitted light pulses will not be reflected within the core of the optical fiber, and the light pulses will no longer traverse the optical fiber. These attenuated portions of light pulses result in signal loss and, thus, degradation of signal quality. Moreover, excess stress on an optical fiber may result in breakage of the fiber resulting in total signal loss.

As the need for greater bandwidth for an enterprise increases, additional optical fibers are provided to satisfy such need. Current optical fiber housing designs do not allow for the termination of an increased number of fibers within a limited amount of space, such as a utility room, which requires the design of a fiber management system that provides a high optical density use, nor the ability to combine splices with optical transition pieces, as well as an easy way to replace damaged components.

Rather, outside plant fiber optic cables are spliced at the customer premises within a splicing closure. The cables are then routed to optical interconnection units where individual fibers are terminated at optical connectors. Since there is a limited amount of space in a utility room, it is desirable to have a splicing system that is small enough to fit within the interconnection unit, which would reduce costs and space associated with using separate splices.

Moreover, the present splice trays that are available in the industry do not provide a strain relief mechanism for the fibers or a protective covering. Therefore, there is a need for an optical fiber splice tray suitable for use in a closure that provides greater organizational capabilities and protection against undesirable external forces.

SUMMARY OF THE INVENTION

These and other deficiencies of the prior art are addressed by the present invention of an optical fiber routing apparatus. The optical fiber routing apparatus includes at least one optical fiber splice tray for retaining optical fibers therein, and at least one rack. Each rack includes at least one shelf extending from a rear wall for respectively supporting the at least one optical fiber splice tray.

At least one retaining flange is respectively coupled to a front edge of each shelf, and a retaining means is respectively coupled to the rear wall proximate a rear edge of each shelf for retaining an optical fiber tray between the rear wall of the rack and the at least one retaining flange on the front edge of a shelf.

BRIEF DESCRIPTION OF THE DRAWINGS

So that the manner in which the above recited features of the invention are attained and can be understood in detail, a more particular description of the invention, briefly summarized above, may be had by reference to the embodiments thereof, which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

The present invention is an organizational tray suitable for use in a closure for facilitating improved organization and routing features of optical fiber cabling. In the following description, numerous specific details are set forth to provide a more thorough understanding of the invention. As will be apparent to those skilled in the art, however, various changes using different configurations may be made without departing from the scope of the invention. In other instances, well-known features have not been described in order to avoid obscuring the invention. Thus, the invention is not considered limited to the particular illustrative embodiments shown in the specification, and all such alternate embodiments are intended to be included in the scope of this invention.

Figures 1A, 1B:
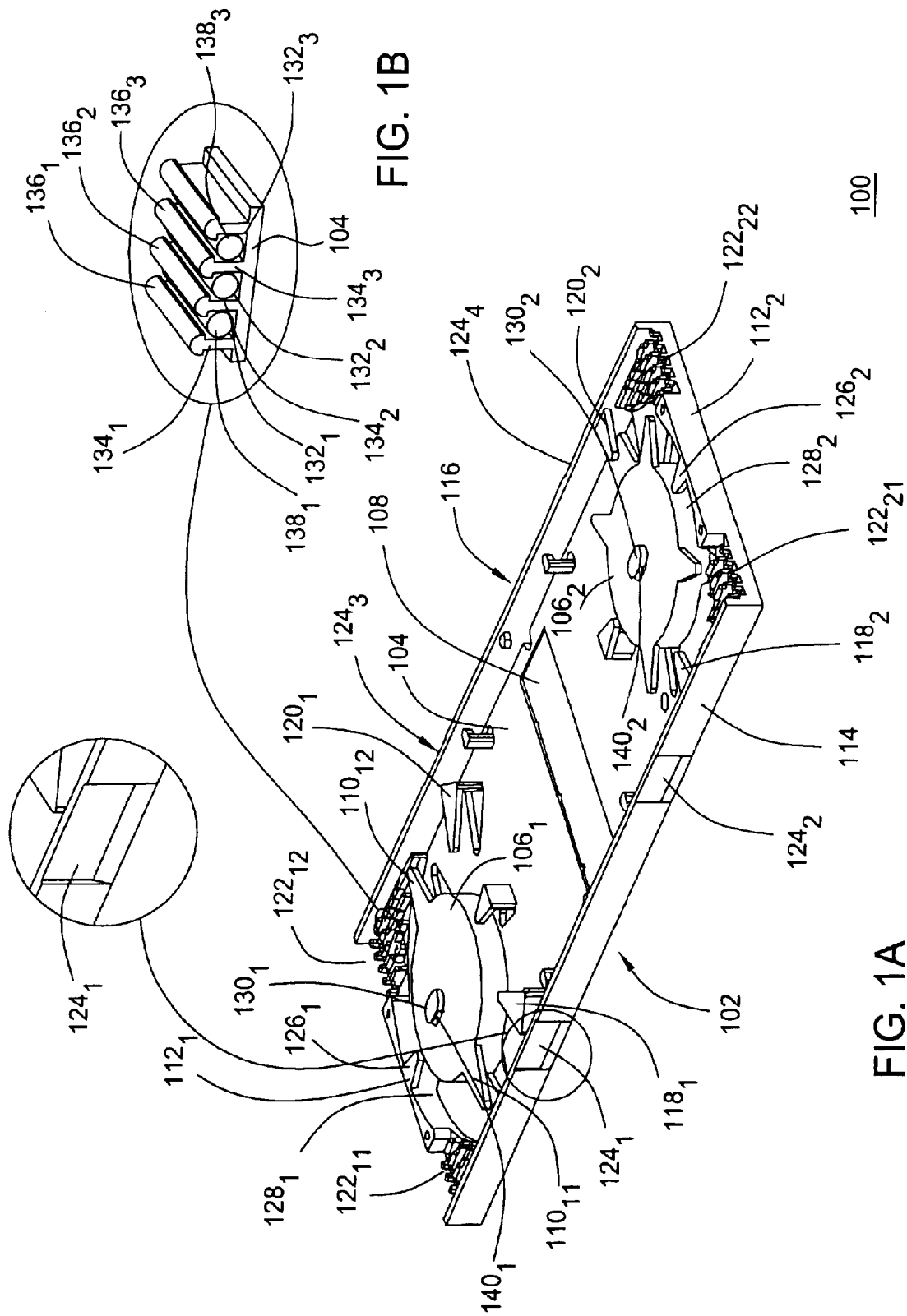
FIGS. 1A and 1B depict an isometric view of an exemplary splice tray of the present invention.

FIGS. 1A and 1B depict an isometric view of an exemplary splice tray 100 of the present invention. The splice tray 100 comprises a lower surface 102, an upper surface 104, and at least one sidewall 112 extending above the upper surface 104. In the exemplary embodiment shown in FIG. 1A, the tray 100 is substantially rectangular in shape, and a pair of opposing sidewalls $112_1$ and $112_2$ (collectively sidewalls 112), a rear wall 116, and a front wall 114 are coupled to an outer edge of the upper surface 104, such that the front and rear walls 114 and 116 also oppose each other and are respectively coupled at each end by the pair of opposing sidewalls 112. It is noted that the exemplary tray 100 is discussed and shown as a symmetrical rectangular tray, however a person skilled in the art will appreciate that the tray 100 may be formed in various shapes, such as a square, circle, oval, ellipse, triangle, among other shapes, as well as combinations thereof.

Disposed above the upper surface 104 and interior to the sidewalls 112 and rear and front walls 116 and 114, is at least one spool 106, and a splice holder 108 for retaining a splice therein. The exemplary splice holder 108 is horizontally mounted to the upper surface 104 of the tray 100 illustratively between a first and second spool $106_1$ and $106_2$. The horizontally orientated splice holder 108 is capable of mounting different types of splices. Further, the horizontal orientation of the splice holder 108 provides improved retention of the optical fiber splices, as well as greater optical fiber splice density to facilitate increased bandwidth requirements of the enterprises.

In one embodiment, the optical fiber spice holder includes a base having an upper surface and a plurality of sidewalls coupled substantially orthogonal to the upper surface. A plurality of first pair of sidewalls of the plurality of sidewalls forms a first channel and a second channel therebetween. The first and second channels respectively have a first radius and a second radius sized to secure a first and second portion of a plurality of optical fiber splices. In a second embodiment, a plurality of third channels is respectively interleaved between each pair of the plurality of first pairs of sidewalls. For a more detailed understanding of the horizontally orientated splice holder 108, the reader is directed to U.S. Pat. No. 6,801,704, issued Oct. 15, 2004, which is incorporated by reference herein its entirety.

The spools $106_1$ and $106_2$ are mounted to the upper surface 104 of the tray 100 and positioned proximate the respective sidewalls $112_1$ and $112_2$. Each spool 106 has a radius that is greater than the optical fiber minimum bend radius, which characterizes the radius below which the optical fiber should not be bent to avoid light ray leakage or degradation. Typically, the minimum bend radius varies with fiber design. Bending an optical fiber with a radius smaller than the minimum bend radius may result in increased signal attenuation and/or a broken optical fiber. Each spool 106 extends above the upper surface 104 such that a plurality of optical fiber cables may be wrapped against a side of the spool 106 during routing through the tray 100.

Each of the spools $106_1$ and $106_2$ include a plurality of spool flanges 110 extending from an upper surface of the spool and illustratively towards the front and rear walls 114 and 116. For example, a first spool $106_1$ includes spool flange $110_{12}$ extending towards the rear wall 116 and a second spool flange $110_{11}$ extending towards the front wall 114. The spool flanges are elevated above the upper surface 104 of the splice tray 100 such that the individual buffered tubes, which wrap around the spool 106, are retained underneath the spool flanges 110. Although the splice tray 100 is discussed as illustratively having two spool flanges 110 extending from a spool 106, one skilled in the art will appreciate that additional spool flanges 110 may be provided as well. For example, the second spool $106_2$ in FIG. 1A is illustratively shown as having four spool flanges 110 extending from the upper surface of the second spool $106_2$.

The front wall 114 and rear wall 116 are also provided with flanges extending toward the interior of the spool tray 100 to retain the optical cabling thereunder as well. In one embodiment the flanges may be coupled directly to either to the front and rear walls 114 and 116, while in an alternate embodiment the flanges may be standoff flanges that are formed proximate the front and rear walls 114 and 116. For example, front wall flange $118_2$ extends from the interior of the front wall 114 proximate the second spool 106 and extends towards the second spool $106_2$. Similarly, and on the opposite side of the rear wall 116 rear wall flange $120_2$ extends from an interior surface of the rear wall 116 towards the second spool $106_2$. It is noted that both the front wall flange $118_2$ and rear wall flange $120_2$ are formed near the upper surface of the front and rear walls 114 and 116 such that the front wall flange $118_2$ and rear wall flange $120_2$ are elevated above the upper surface 102 of the splice tray 100.

In the second embodiment noted above, an exemplary front wall flange 118 is L-shaped and extends proximate to front wall 114 and extends towards the first spool $106_1$. Similarly, the exemplary rear wall flange $120_1$ is also L-shaped and positioned proximate the rear wall 116, and extends towards the first spool $106_1$. The L-shape of the front wall and rear wall flanges $118_1$ and $120_1$ in the second embodiment illustratively have the shorter leg of the L attached to the upper surface 104 of the splice tray 100, while the larger leg is elevated above the upper surface 104 of the splice tray 100 and extends toward the exemplary first spool $106_1$. In either embodiments, the front and rear wall flanges 118 and 120 help retain and route the optical fibers around their respective spools $106_1$ and to the splice holder 108.

In an embodiment where each of the spools 106 is proximate the opposing sidewalls $112_1$ and $112_2$, an interior surface 128 of each of the sidewalls is curved to conform to the circular shape of the spools 106. For example, curved inner sidewall $128_1$ is formed near the first spool $106_1$, while curved inner sidewall $128_2$ is formed proximate the second spool $106_2$. In addition, sidewall flanges $126_1$ and $126_2$ are respectively formed at the upper surface of the first and second curved inner sidewalls $128_1$ and $128_2$ and extend inward towards the first and second spools $106_1$ and $106_2$.

The first and second sidewall flanges $126_1$ and $126_2$ are elevated above the upper surface 104 of the splice tray 100 to also retain the optical fibers thereunder as they wrap around their respective spools 106.

A plurality of retention tabs are formed proximate each sidewall 112 and the front and rear walls 114 and 116. For example, a first plurality of retention tabs $122_1$ is formed proximate the first sidewall $112_1$ and the front wall 114, a second plurality of retention tabs $122_{12}$ is formed proximate the first sidewall $112_1$ and the rear wall 116, a third plurality of retention tabs $122_{21}$ is formed proximate the second sidewall $112_2$ and the front wall 114, and a fourth plurality of retention tabs is formed proximate the second sidewall $112_2$ and the rear wall 116. Each of the plurality of retention tabs 122 are aligned to form channels 132 as illustratively shown in the exploded view of FIG. 1B.

The channels 132 extend a length from each of the sidewalls 112 towards the interior of the splice tray 100, such that the optical fiber strands may be retained within the channels 132 from the sidewalls 112 and routed towards the spools 106 and splice holder 108. Each of the channels 132 is formed by adjacent sidewalls 134. For example, as shown in FIG. 1B, exemplary sidewalls $134_1$ and $134_2$ form channel $132_1$, while sidewalls $134_2$ and $134_3$ form channel $132_2$, and so forth. The channels are sized to accommodate the diameter of an optical fiber strand such as an individual optical strand having a diameter of 0.12 inches.

A dual sided flange 136 is formed on an upper portion of each of the sidewalls 134. The dual sided flanges 136 extend inwardly over each channel region 132 such that two opposing flanges (e.g., $136_1$ and $136_2$) form a gap therebetween to allow the insertion of the optical fibers 138. For example, optical fiber strand $138_1$ is disposed in channel $132_1$, which is formed by sidewalls $134_1$ and $134_2$ and the upper surface 104 of the splice tray 100. Furthermore, flanges $136_1$ and $136_2$ extend a distance over the optical fiber strands $138_1$ thereby retaining the strands within the channels $132_1$. The retention tabs 122 are fabricated from a flexible material such as silicone rubber, Neoprene rubber, plastic, and polypropylene, among others. The flexible material allows the insertion and removal of the optical fiber strands during installation and maintenance procedures. Each of the plurality of retention tabs 122 may be of the same size, or varied in size to accommodate different size optical fiber strands. Moreover, the length of the channels 132 may vary depending on how the optical fiber strand 138 is to be routed within the splice tray 100.

The front wall 114 and rear wall 116 further comprise one or more tapered recesses 124 positioned on a respective exterior portion of the walls 114 and 116 to allow the splice tray 100 to be retained in a rack, such as a rack 200 as illustratively shown and discussed below with respect to FIG. 2. For example, a first tapered recess $124_1$ is formed on the exterior portion of the front wall 114 proximately between the first spool $106_1$ and the splice holder 108, while a second tapered recess $124_2$ is formed on the exterior of the front wall 114 proximately between the splice holder 108 and the second spool $106_2$. Similarly, a third tapered recess is formed on the exterior of the rear wall 116 proximately between the first spool $106_1$ and splice holder 108, while a fourth tapered recess $124_4$ is formed on the exterior of the rear wall 116 proximately between the splice holder 108 and the second spool $106_2$. Each of the tapered recesses $124_1$ through $124_4$ (collectively tapered recesses 124) serve as notches formed in the exterior of both the front and rear walls 114 and 116. The tapered recesses 124 are sized to conform to retaining flanges 212 on the rack 200, as discussed in detail below with respect to FIG. 2.

It is noted that the splice tray 100 shown in FIG. 1A is symmetrical in shape and therefore the front wall 114 and rear wall 116 configuration are identical, and the terminology of the front wall 114 and rear wall 116 are simply used for the convenience of understanding the invention. As will be seen in greater detail below, either the front wall 114 or rear wall 116 may be initially inserted into the rack 200, such that the opposing wall interfaces with the retaining flanges 212 to retain the splice holder 100 within the rack 200.

Figure 6:
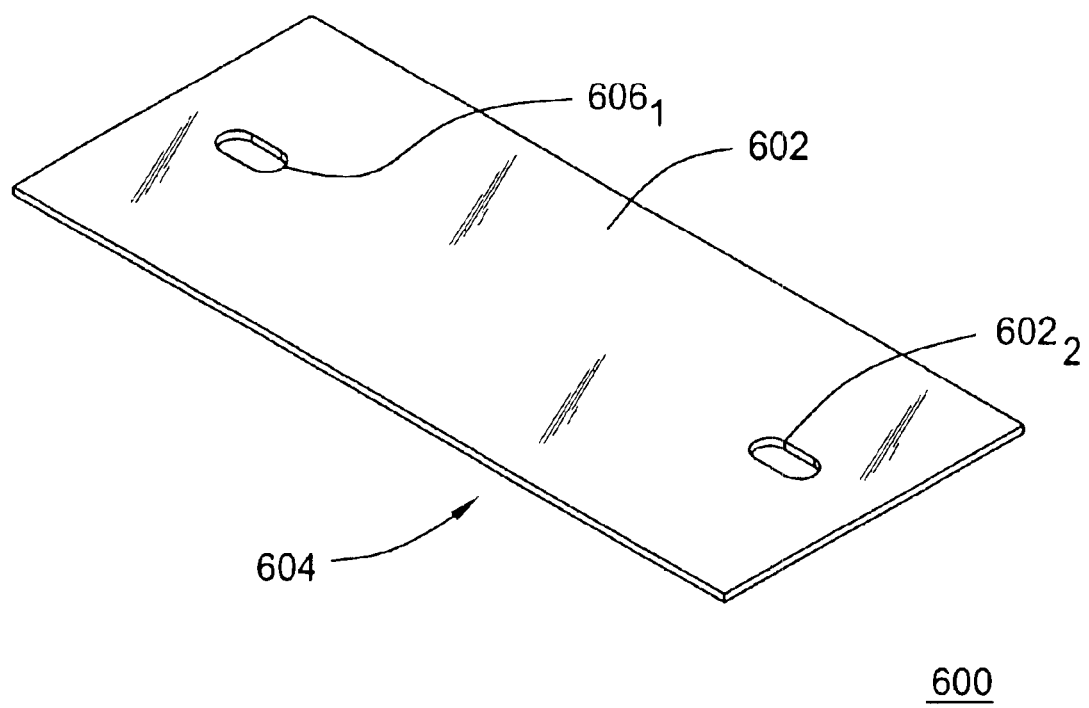
FIG. 6 depicts an isometric view of a splice tray lid suitable for covering the splice tray of FIG. 1.

FIG. 6 depicts an isometric view of a splice tray lid suitable for covering the splice tray 100 of FIG. 1. In particular, the splice tray lid 600 comprises an upper surface 602 and a lower surface 304. The splice tray lid 600 is rectangular in shape and sized to fit over the splice tray 100 such that the circumference of the lid 600 is substantially equal in size to the circumference of the splice tray 100. Each of the spools 106 comprises a lid tab 130 extending from the upper surface of the spool 106. For example, the first spool $106_1$ illustratively comprises an elliptical shaped lid tab $130_1$ extending above the upper surface of the first spool $106_1$. Similarly, a second elliptical lid tab $130_2$ is formed on the upper surface of the second spool $106_2$. Each of the lid tabs $130_1$ and $130_2$ form a respective gap $140_1$ and $140_2$ between a lower portion of the lid tabs $130_1$ and $130_2$ and the upper surface of the first and second spools $106_1$ and $106_2$. The height of the gaps 140 is substantially equal to the thickness of the lid 600.

The lid 600 further comprises a pair of exemplary apertures $606_1$ and $606_2$, which are also elliptical in shape and are sized to fit over the respective lid tabs $130_1$ and $130_2$. In the exemplary embodiment of FIG. 1A, the lid tabs 130 extend outward towards the first sidewall $112_1$ and parallel to the upper surface of each spool $106_6$. Accordingly, when the lid 600 is disposed onto the splice tray 100, the apertures $606_1$ and $606_2$ are respectively aligned over the lid tabs $130_1$ and $130_2$ and the lid 600 is pushed down, such that the bottom surface 604 of the lid 600 rests upon the upper surface of the spools 106. The lid 600 is then slideably moved towards the opposing sidewall $112_2$, thereby locking the lid 600 in the gaps $140_1$ and $140_2$ between a lower surface of the lid tabs 130 and the upper surface of the spools 106. To remove the lid 600, the lid is slid towards the first sidewall $112_1$, and then lifted upward such that the apertures $606_1$ and $606_2$ pass around the lid tabs $130_1$ and $130_2$. Thus, the lid 600 protects the optical fiber strands and splices in the splice tray 100 from the external environment.

Figure 2:
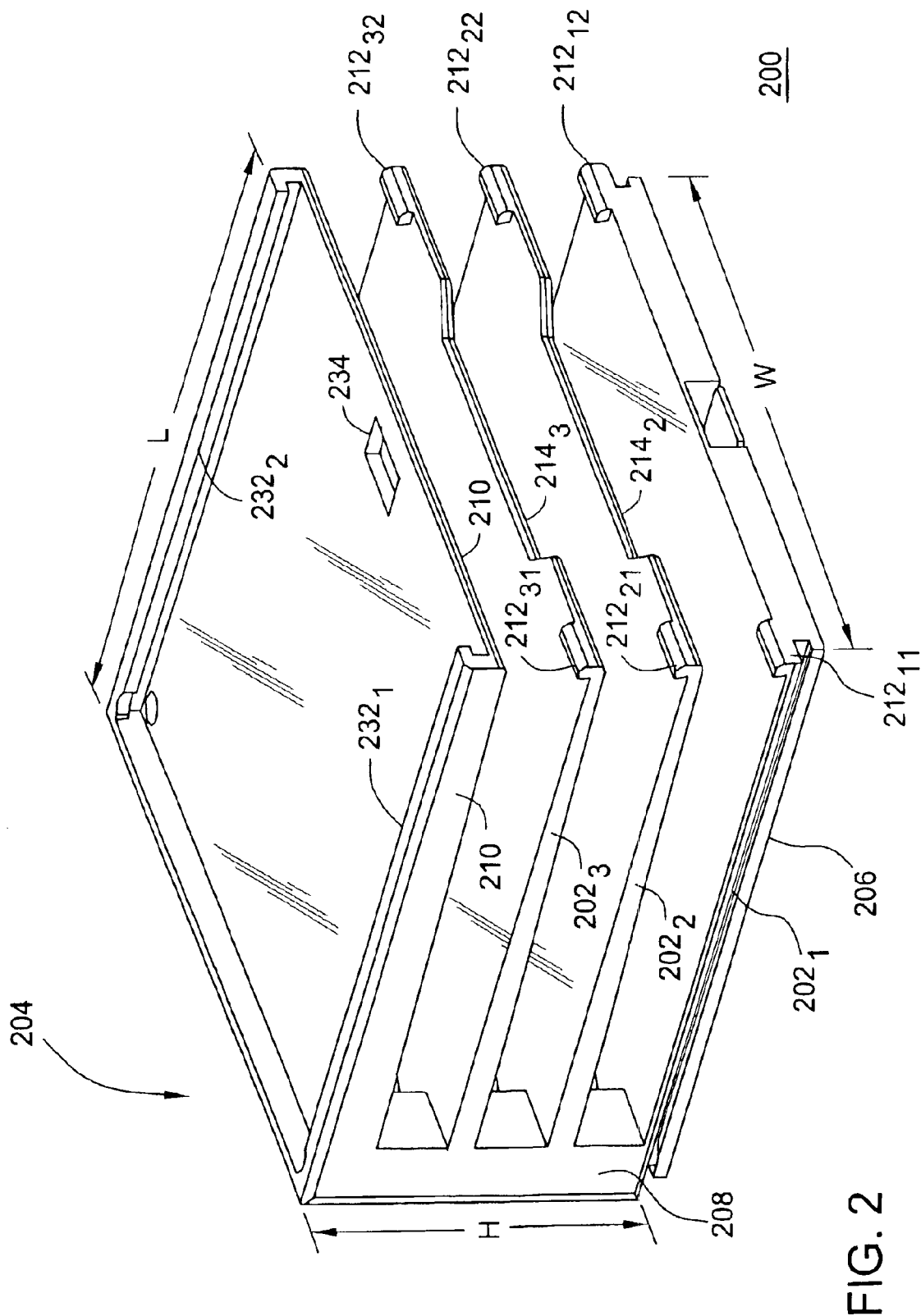
FIG. 2 depicts an isometric view of an exemplary splice tray rack suitable for retaining the splice tray of FIG. 1.

FIG. 2 depicts an isometric view of an exemplary splice tray rack 200 of the present invention. The exemplary splice tray rack 200 comprises a plurality of shelves 202 having one or more retaining flanges 212, a rear 204, a base 206, a plurality of rails 208, and a lid 210. The rack 200 is used to stack a plurality of the splice trays 100, illustratively in a horizontal position respectively on the plurality of the shelves 202. The stacking of the splice trays 100 in a rack 200, such as shown in FIG. 2, allows for increased density of fiber optical cable routing in a fiber optic closet of an enterprise, as well as ease of accessibility to the splice trays 100 for locating and accessing a particular splice, illustratively during maintenance or providing additional splices.

The plurality of shelves 202 extend from the rear wall 204 of the rack 200 such that the shelves 212 are disposed above one another. For example, shelf $202_1$ is illustratively formed as a lower shelf disposed over the base 206, and a second shelf $202_2$ is disposed a distance above the first shelf $202_1$. Similarly, a third shelf $202_3$ is formed over the second shelf $202_2$. In the exemplary rack 200 shown in FIG. 2, three shelves 202 are illustratively shown, however, one skilled in the art will appreciate that additional shelves may be added to accommodate the stacking of more than three splice trays 100.

A pair of rails 208 extend vertically upward from the base to a top 210, which is disposed over the third shelf $202_3$. In particular, a pair of rails 208 are formed proximate the rear wall 204 and are rectangular in shape. The rails 208 provide structural support and integrity to the rack 200.

On a front edge 214 of the shelves opposing the rear wall 204 is a pair of upward extending retaining flanges 212. For example, the first shelf $202_1$ comprises on each end of front edge 214, upward extending retaining flanges $212_{11}$ and $212_{12}$. Similarly, the second shelf $202_2$ comprises on each end of front edge $214_2$, upward extending retaining flanges $212_{21}$ and $212_{22}$.

Each of the splice trays 100 is disposed over an upper surface of each shelf 202, such that the exemplary rear wall 116 of the tray 100 is in contact with the pair of rails 208, and the front wall 114 of the tray 100 is in contact with the upward extending retaining flanges 212. Referring to FIGS. 1A and 2, for example, the tapered recesses $124_3$ and $124_4$ on the rear wall 116 are aligned with the pair of rails 208. That is, the distance between the rear wall tapered recesses $124_3$ and $124_4$ is equidistant to that of the vertical pair of rails $208_1$ and $208_2$. Further, the upward extending retaining flanges 212 are aligned with the first and second tapered recesses $124_1$ and $124_2$ on the front wall 114, as discussed in further detail below with respect to FIG. 5. Thus, the length of the shelves 202 as between the rails 208 and the retaining flanges 212 are sized to securely retain each of the splice trays in the rack 200.

Figure 3:
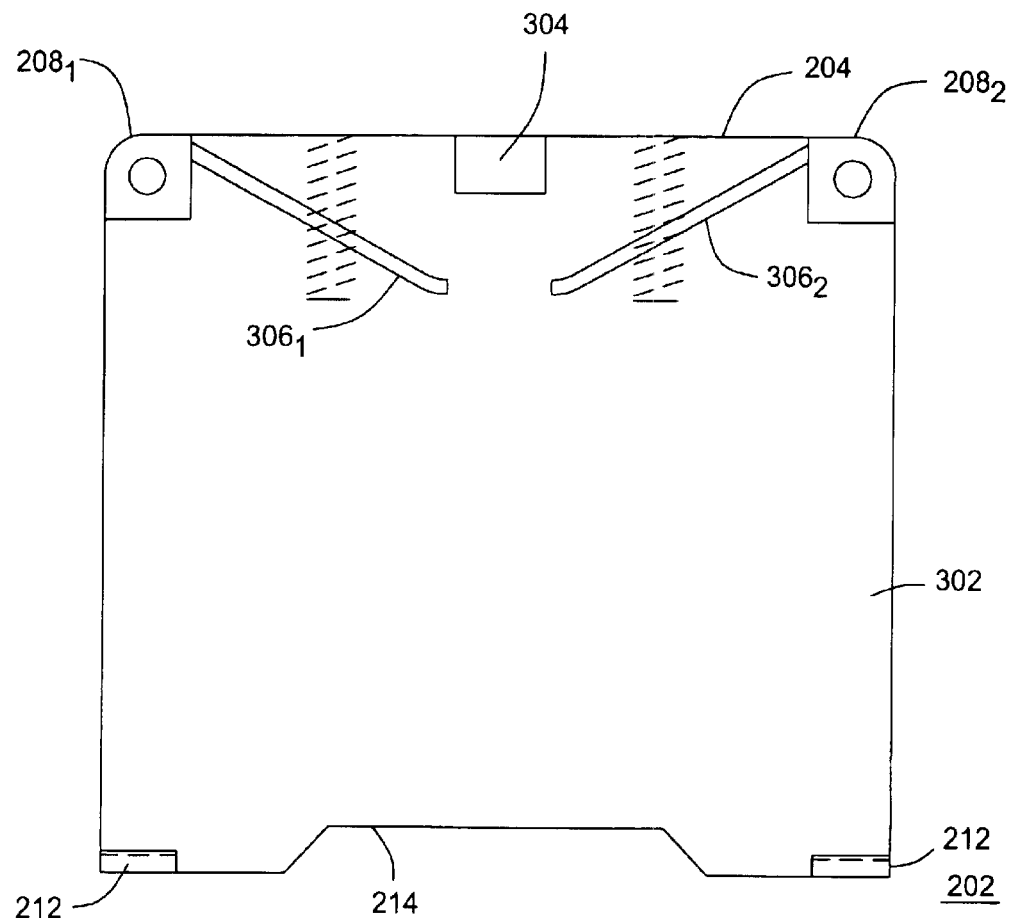
FIG. 3 depicts a top view of an exemplary shelf of the rack of FIG. 2.

FIG. 3 depicts a top view of an exemplary shelf 202 of the rack 200 of FIG. 2. Each shelf 202 comprises an upper surface 302 and a backstop 304. The backstop 304 is formed on the upper surface 302 against the rear wall 204 and between the pair of rails $208_1$ and $208_2$. Furthermore, at least one spring 306 is coupled to each of the rails $208_1$ and $208_2$, and extends a distance from the rear wall 204 past the backstop 304 towards the front edge 214 of the shelf 202. In the embodiment shown in FIG. 3, two springs $306_1$ and $306_2$ are illustratively shown. The springs 306 are fabricated from flexible metal material, such as sheet metal, plastic or any other flexible material. The springs $306_1$ and $306_2$ are depressed towards the backstop 304 when pressure is exerted against the springs towards the rear wall 204, and return back to their original straightened linear position when relieved of such force. Although the springs 306 are illustratively shown as two leaf springs $306_1$ and $306_2$ extending from the rear wall 204 and rails $208_1$ and $208_2$, a person skilled in the art will appreciate a single leaf spring may be utilized, or one or more coil springs (shown in phantom in FIG. 3) may be attached to the rear wall 204 that extend past the rails 208 towards the front edge 214 of the shelf 202.

Figure 4:
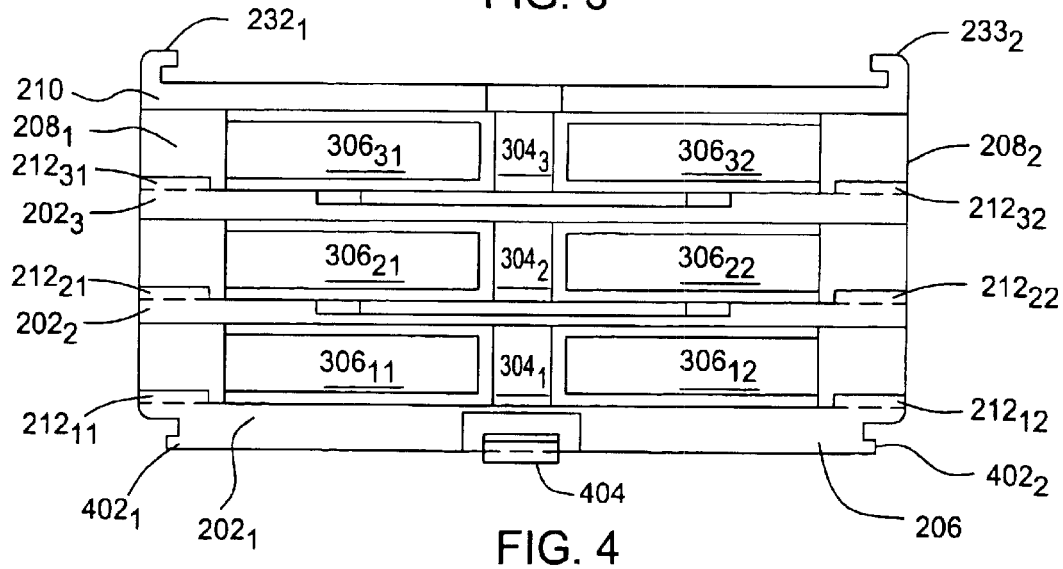
FIG. 4 depicts a front view of the rack of FIG. 2.

FIG. 4 depicts a front view of the rack of FIG. 2. In particular, the plurality of shelves $202_1$ through $202_3$, are spacively stacked over the base 206, and the top 210 is disposed over the upper shelf $202_3$. The distance between each shelf 202 is sized to receive a splice tray 100. Each shelf has a backstop 304 illustratively positioned midway along the rear wall 204, and the leaf springs $306_1$ and $306_2$ extend from the rear wall 204 and rails 208 towards the front edge 214 of each shelf 202. In particular, the lower shelf $202_1$ comprises a centered backstop $304_1$ and springs $306_{11}$ and $306_{12}$ respectively coupled to the rails $208_1$ and $208_2$ proximate the rear wall 204. Similarly, the second shelf $202_2$ comprises a centered backstop $304_2$ and leaf springs $306_{21}$ and $306_{22}$ respectively coupled to the rails $208_1$ and $208_2$ proximate the rear wall 204, and so forth.

Referring to FIGS. 2 and 4 together, it is noted that the top cover 210 of the rack 200 comprises U-shaped flanges $232_1$ and $232_2$ respectively on each edge, which extends from the rear 204 to the front edge 214. The U-shaped flanges 232 extend inwardly towards the interior of the top 210. Furthermore, referring to FIG. 4 the base 206 also comprises a pair of base flanges $402_1$ and $402_2$ extending outward parallel to the shelves along opposing sides of the base 206, orthogonal to the rear wall 204 of said rack 200. That is, the base flanges $402_1$ and $402_2$ extend along the length of the base 206 from the rear wall 204 to the front edge 214 and are capable of interlocking with the U-shaped flanges 232 formed on the top 210.

Accordingly, a plurality of racks 200 may be stacked one upon each other, such that the base 206 of one rack and top 210 of another rack interlock in a secure manner. Furthermore, the top 210 further comprises an aperture 234 adapted to receive a tab 404 formed on the bottom surface of a base 206 of another rack. In particular, a tab 404 is fabricated from a flexible material (e.g., plastic), such that when the tab 404 of an upper rack is aligned with the aperture 234 of a lower rack therebelow, the tab 404 interlocks with the aperture 234, thereby locking the two racks together, such that the upper rack may be stacked upon the lower rack, and so forth.

Figure 5:
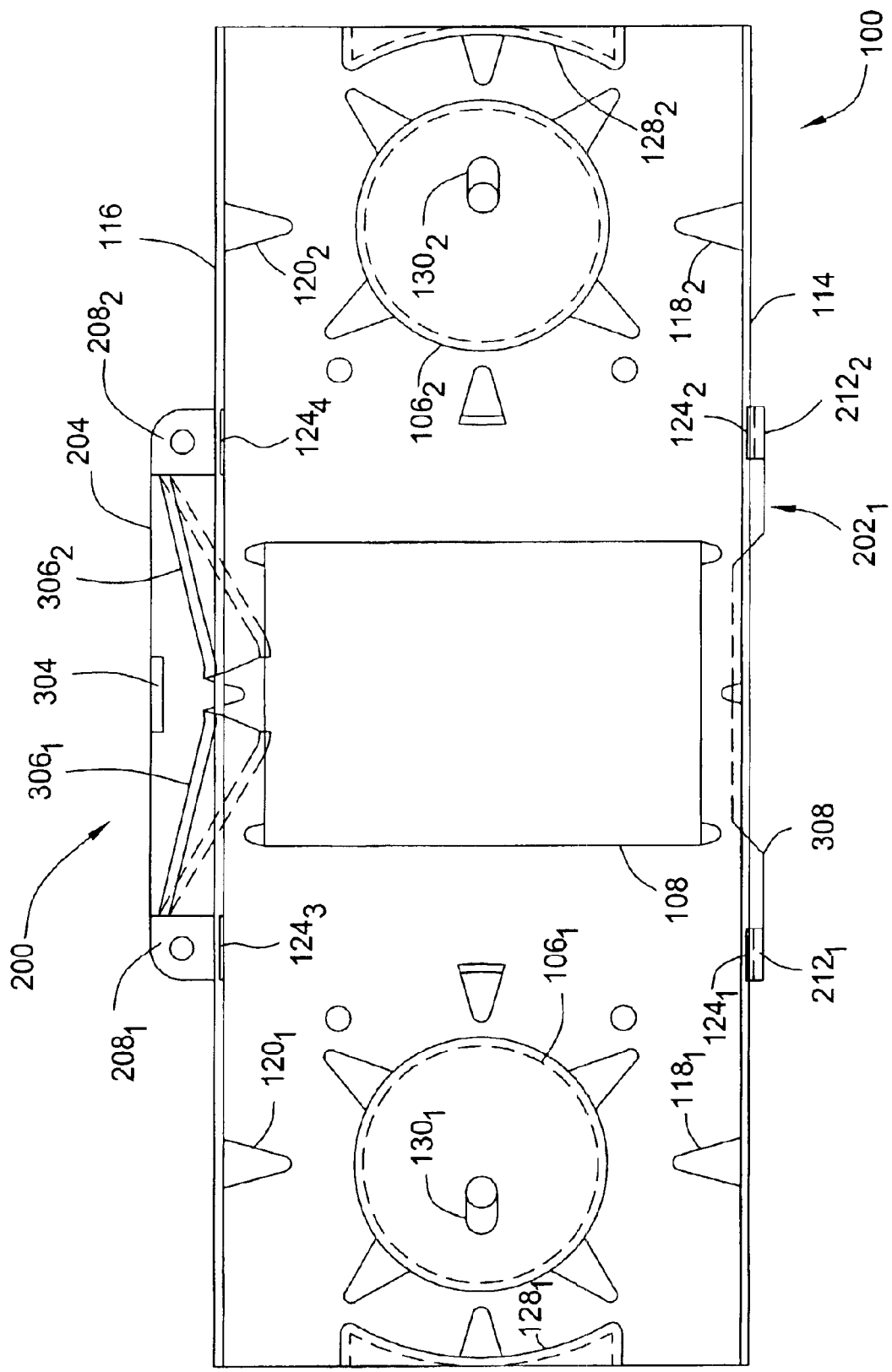
FIG. 5 depicts a top view of the splice tray of FIG. 1 while inserted in the exemplary shelf of FIG. 3.

FIG. 5 depicts a top view of the splice tray 100 of FIG. 1 retained by an exemplary shelf 202 of FIG. 3. In particular, the rear wall 116 of the splice tray 100 is seated adjacent to the rear 204 of the rack 200 such that the tapered recesses $124_3$ and $124_4$ are aligned with the rails $208_1$ and $208_2$. Furthermore, the front wall 114 of the splice tray 100 is seated adjacent to the front edge 308 of the shelf $202_1$, such that the tapered recesses $124_1$ and $124_2$ are interlocked with the respective retaining flanges $212_1$ and $212_2$. It is noted that the width of the rack 200 is less than the width of the splice tray 100, such that portions of the splice tray proximate the sidewalls 112 extend past the side edges of the shelf 202.

Referring to FIG. 2 in conjunction with FIG. 5, the splice tray 100 is inserted between and inserted over the retaining flanges 212 of a particular shelf 202 and pushed back toward the rear wall 204 of the rack 200. The rear wall 116 of the splice tray 100 forcibly engages the leaf springs $306_1$ and $306_2$ and pushes the leaf springs $306_1$ and $306_2$ back towards the backstop 304 on the rear wall 204 of the rack 200. Once the splice tray 100 has been pushed all the way back against the rails $208_1$ and $208_2$ of the rack 200, the front wall 114 of the tray 100 is pushed downward, until the bottom surface 102 of the tray 100 contacts with the upper surface 302 of shelf 202. Upon releasing the tray 100 in the rack 200, a backward force is exerted by the leaf springs $306_1$ and $306_2$ to push the splice tray 100 forward. In particular, the leaf springs $306_1$ and $306_2$ exert pressure on the rear wall 116 of the tray 100, thereby interlocking the tapered recesses 124 of the front wall 114 against the retaining flanges 212 on the front edge 214 of the shelf 202.

In order to remove a stackable splice tray 100 from a shelf 202, a reverse force must be exerted on the front wall 114 of the splice tray 100 to push the tray 100 and springs 306 backward. Specifically, the tray 100 is pushed back against the rails 208. The front of the splice tray is lifted upward to unlock the tapered recesses $124_1$ and $124_2$ from the respective retaining flanges $212_1$ and $212_2$. Once the bottom portion of the splice tray 100 is unlocked and lifted above the retaining flanges 212, the leaf springs $306_1$ and $306_2$ exert a force to push the rear wall 116 of the splice tray 100 forward, thereby ejecting the splice tray 100 from the shelf 202 splice tray rack 200.

As shown in FIG. 5, the movement of the leaf springs $306_1$ and $306_2$ are illustratively shown where the leaf springs $306_1$ and $306_2$ are providing pressure against the rear wall 116 when the splice tray is locked in the shelf 202. When the splice tray 100 is being ejected from the shelf 202, the leaf springs $306_1$ and $306_2$ return to their original static position (shown in phantom), which is towards the front edge 214 of the shelf 202.

Accordingly, a plurality of splice trays 100 may be conveniently stacked and retained in the rack 200 to provide improved organization for routing fiber optic strands and reduce entanglements. Further, the racks 200 themselves may also be stacked to further reduce the amount of real estate required at an enterprise, which improves cost savings.

Access to the individual trays 100 is improved, since the trays 100 have a width greater than a width of a respective shelf in the rack 200, and the sides of the shelves are exposed. Thus, maintenance activities, such as tracing fibers to a particular tray in the rack, as well as installing and removing the tray, are uncomplicated and relatively effortless.

Although various embodiments that incorporate the teachings of the present invention have been shown and described in detail herein, those skilled in the art can readily devise many other varied embodiments that still incorporate these teachings.

What is claimed is:

1. An optical fiber routing apparatus, comprising:
   at least one optical fiber splice tray having an upper surface having a front wall and a rear wall extending substantially orthogonal from an edge of said upper surface and a first pair of tapered recesses formed on an outer surface of said front wall of said tray and adapted for interlocking with a pair of retaining flanges; and
   at least one rack, wherein each rack comprises:
      at least one shelf extending from a rear wall for respectively supporting said at least one optical fiber splice tray;
      a pair of retaining flanges, each extending upward on opposing ends of said front edge of said at least one shelf; and
      a retaining means coupled to the rear wall for retaining said optical fiber tray between said rear wall and said pair of retaining flanges.

2. The apparatus of claim 1, wherein said retaining means comprises:
   at least one spring extending outward from said rear wall of said rack towards said front edge.

3. The apparatus of claim 2, wherein said at least one spring comprises at least one of a leaf spring and a coil spring.

4. The apparatus of claim 2, wherein said at least one spring compresses backwards towards said rear wall when said tray is inserted over said shelf, and expands towards said front edge of said shelf upon release of said tray to force said tray against said at least one retaining flange.

5. The apparatus of claim 2, wherein said rack further comprises a plurality of adjacent shelves extending from said rear wall, said adjacent shelves spaced apart a distance to accommodate a respective plurality of trays.

6. The apparatus of claim 5, further comprising a pair of rails, each rail extending vertically along opposing edges of said rear wall.

7. The apparatus of claim 6, further comprising a backstop extending outward from said rear wall between said pair of rails and towards said front edge a distance less than said at least one spring.

8. The apparatus of claim 7, wherein said at least one spring comprises a pair of leaf springs, each said leaf spring respectively extending proximate one of said pair of rails towards said front edge of said shelf.

9. The apparatus of claim 1, wherein a second pair of tapered recesses formed on an outer surface of said rear wall of said tray.

10. The apparatus of claim 9, wherein a width of said at least one shelf is less that a width of said tray.

11. The apparatus of claim 9, wherein a length of said at least one shelf is substantially equal to a length of said tray.

12. The apparatus of claim 1, wherein said at least one tray further comprises:
   at least one spool disposed over an upper surface and a distance from said edge, wherein said at least one spool has a radius greater than a critical bend radius of said optical fibers, wherein said optical fibers are routed around said at least one spool;
   a splice holder disposed over said upper surface; and
   a plurality of retention tabs positioned proximate said edge and adapted to retain and route a respective plurality of buffered optical fiber strands to said splice holder.

13. The apparatus of claim 12, wherein said tray is substantially rectangular in shape and further comprises a pair of opposing sidewalls extending substantially orthogonal from said edge of said upper surface respectively between said front and rear walls.

14. The apparatus of claim 13, wherein said at least one spool comprises a pair of spools positioned proximate said respective pair of opposing walls.

15. The apparatus of claim 14, wherein each said opposing sidewall comprises a curved interior surface conforming to said respective pair of spools.

16. The apparatus of claim 15 further comprising a plurality of retention flanges coupled to each said sidewall, said plurality of flanges extending inward and substantially parallel over said upper surface.

17. The apparatus of claim 12, further comprising a tray lid having an edge respectively conforming in shape to said edge of said tray and disposed over said upper surface of said tray.

18. The apparatus of claim 12, wherein said plurality of retention tabs comprise a plurality of channels, each channel comprising:
   a pair sidewalls extending substantially orthogonal from said upper surface; and
   a dual sided flange formed on an upper portion of each of the sidewalls, said dual sided flanges extending inwardly over each channel, where two opposing inwardly extending flanges form a gap therebetween to allow insertion of optical fiber strands into said channel.

19. An optical fiber routing apparatus, comprising:
   at least one optical fiber splice tray for retaining optical fibers therein; and
   at least one rack, wherein each rack comprises:
      at least one shelf extending from a rear wall for respectively supporting said at least one optical fiber splice tray;
      at least one retaining flange coupled to a front edge of said at least one shelf; and
      a retaining means coupled to the rear wall for retaining said optical fiber tray between said rear wall and said at least one retaining flange;
      a base formed below a lower shelf of said at least one shelf; and
      a rack top extending from said rear wall of said rack and disposed over an upper shelf of said at least one shelf and having a pair of U-shaped flanges extending inward and parallel to said at least one shelf, along opposing sides of said rack top and substantially orthogonal to said rear wall of said rack, each said U-shaped flange sized to receive a respective base flange from a second rack; and
      an aperture formed in said rack top, said aperture sized to receive a respective tab of base from the second rack.

20. The apparatus of claim 19, wherein said base further comprises:
   a pair of base flanges extending outward and parallel to said at least one shelf, along opposing sides of said base and substantially orthogonal to said rear wall of said rack; and
   a tab formed on a bottom surface of the base.

21. An optical fiber routing apparatus, comprising:
   at least one rack, wherein each rack comprises:
      at least one shelf extending from a rear wall for respectively supporting said at least one optical fiber splice tray;
      a pair of retaining flanges, each extending upward on opposing ends of a front edge of said at least one shelf; and
      a retaining means coupled to the rear wall, wherein each shelf is adapted to receive a respective optical fiber splice tray between said retaining means and said pair of retaining flanges; said tray having an upper surface having a front wall and a rear wall extending substantially orthogonal from an edge of said upper surface and a first pair of tapered recesses formed on an outer surface of said front wall of said tray and adapted for interlocking with said pair of retaining flanges.

* * * * *